United States Patent [19]

Dyer

[11] Patent Number: 4,852,894
[45] Date of Patent: Aug. 1, 1989

[54] APPARATUS FOR CONVERTING A CAR SEAT TO A STROLLER

[76] Inventor: Gloria Dyer, 8429 Menke Way, Citrus Heights, Calif. 95610

[21] Appl. No.: 150,909

[22] Filed: Feb. 1, 1988

[51] Int. Cl.⁴ .............................................. B62B 1/04
[52] U.S. Cl. ..................................... 280/30; 280/643; 297/250
[58] Field of Search ................. 280/30, 643, 644, 639, 280/641, 642, 647, 657, 658; 297/130, 250, 254, 467, DIG. 4

[56] References Cited

U.S. PATENT DOCUMENTS

| | | | |
|---|---|---|---|
| 3,116,069 | 12/1963 | Dostal | 280/30 |
| 3,829,113 | 8/1974 | Epelbaum | 280/30 |
| 3,944,241 | 3/1976 | Epelbaum | 280/30 |
| 4,641,844 | 2/1987 | Mar et al. | 280/30 |

Primary Examiner—Charles A. Marmor
Assistant Examiner—Richard Camby
Attorney, Agent, or Firm—Mark C. Jacobs

[57] ABSTRACT

Apparatus for converting a car seat to a stroller including a wheeled structure removably attached to the car seat for converting the same to a stroller. The wheels of the wheeled structure are movable to a stored, inoperative position or to an operative position for use as supporting wheels when the apparatus is used as a stroller.

17 Claims, 3 Drawing Sheets

APPARATUS FOR CONVERTING A CAR SEAT TO A STROLLER

BACKGROUND OF THE INVENTION

1. Field of the Invention

The invention relates to car seats and strollers; and, more particularly, to improved apparatus for converting a conventional car seat to a stroller.

2. Description of the Prior Art

In my U.S. Pat. No. 4,570,956, I describe apparatus for converting a car seat to a stroller. In this patent, the rear wheels of the apparatus are fixed in position and disposed beneath the base of the framework of the apparatus. When this structure is used in a car, the rear wheels abut against the seat of the car when the apparatus is used with the wheeled assembly as a permanent part of the apparatus. This renders the apparatus awkward to use since the car seat juts away from the seat of the car making it uncomfortable and unstable. Also, it is difficult to use the existing seat belts of the car to strap in the child further.

There thus exists a need for apparatus for converting a car seat to a stroller wherein the wheels thereof can be pivoted or rotated out of the way, when the apparatus is used as a car seat, then quickly and easily pivoted or rotated into operative position when it is desired to use the apparatus as a stroller.

SUMMARY OF THE INVENTION

It is an object of this invention to provide improved apparatus for quickly and easily converting between a car seat and a stroller wherein the wheels thereof can be rotated or pivoted between operative and inoperative positions.

It is a further object of this invention to carry out the foregoing object by providing attaching structure having a wheel assembly and handle, which may be permanently or removably attached to a conventional car seat.

These and other objects are preferably accomplished by providing a car seat portion having a wheeled understructure. The wheels of the understructure are movable from a stored, inoperative position to an operative position for use as supporting wheels when the apparatus is used as a stroller.

DESCRIPTION OF THE PREFERRED EMBODIMENT

Figure 1:
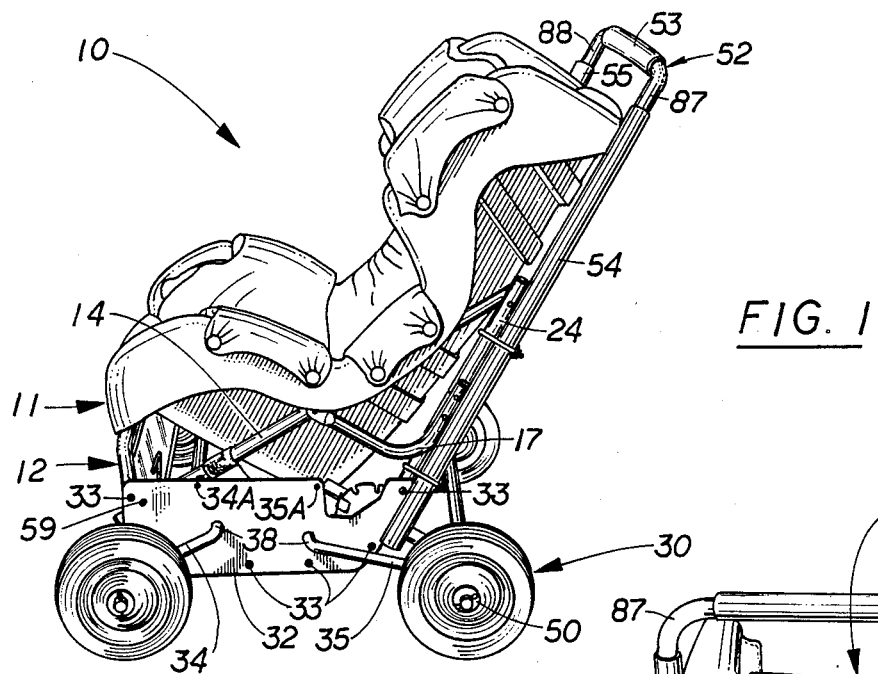
FIG. 1 is a vertical side perspective view of the car seat and stroller combination in accordance with the invention in its stroller position.
Figure 3:
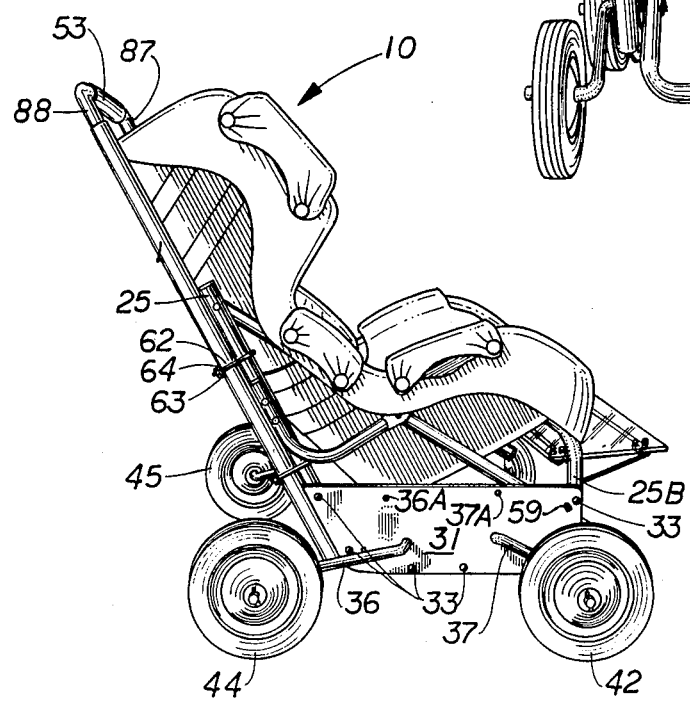
FIG. 3 is a view similar to FIG. 1 showing the other side thereof.
Figure 4:
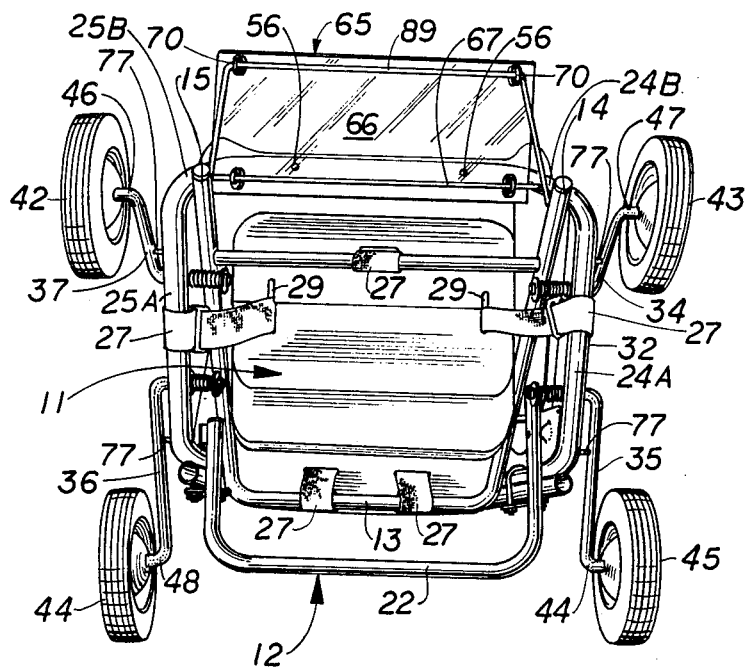
FIG. 4 is a bottom perspective view illustrating the bottom front portion of the combination of FIGS. 1 through 3.

Referring now to FIG. 1 of the drawing, apparatus 10 in accordance with the invention is shown. Apparatus 10 includes a conventional car seat portion 11 and a supporting framework 12 that may vary from car seat to car seat. In this embodiment, framework 12 includes horizontal conventional tubing 13 (FIG. 2) extending along the back of the car seat portion, then downwardly at each side thereof toward the front forming side portions 14 and 15 where they are connected at the front by cross bar 23 (FIG. 4). A pair of rear downwardly extending tubings 24, 25 (FIGS. 1 and 3) are coupled to the side portions 14, 15 at the top thereof and to the upper ends of curved side braces 17, 18 by suitable rivets 26 or the like (FIG. 1). Downwardly angled side portions 14 and 15 (FIGS. 1 and 3) are connected via nuts and bolts 21 or the like (FIG. 3) to each side of braces 17, 18, at the ends opposite the connection sto tubings 24, 25. Integral to and extending normally from tubins 24, 25 are bottom tubings 24A, 25A, generally vertically disposed, at the opposite end of tubings 24A, 25A are short tubes 24B and 25B. These are spaced apart, and parallel. Front tubing 16 connects short tubes 24B and 25B. A rear U-shaped tubing 22 is secured to the lower ends of tubings 24, 25 (FIG. 4).

A U-shaped back support 52, (FIG. 2) is provided comprised of an upper cross-piece 53 and downwardly extending side tubing members 54, 55.

Cross-piece 53 (FIG. 2) is connected at each end to curved angled portions 87, 88 which telescope into open ends of cross-piece 53 and the open upper ends of side members 54, 55. If cross piece 53 is made itself nestable and contractable, then manner, cross-piece 53 could be removed and portions 87, 88 turned rearwardly to provide a car seat support for suspending apparatus 10 from the seat of a car, if so desired. However, as shown, cross-piece 53 is receivable in the upper ends of tubing member 54, 55 via portions 87 & 88 and is retained in position by removable release pins 60, 61, respectively, or by any other suitable means. A plurality of U-shaped clamps 62 (see also FIG. 3) hold the back support to the framework 12 by removably securing the same to tubings 24, 25, nuts 63 being used to secure the free legs of each clamp 62 to apertured plates 64.

The car seat portion 11 may be of conventional design and the framework 12 may be of a unitary piece, separable parts, collapsible, etc.

Figure 2:
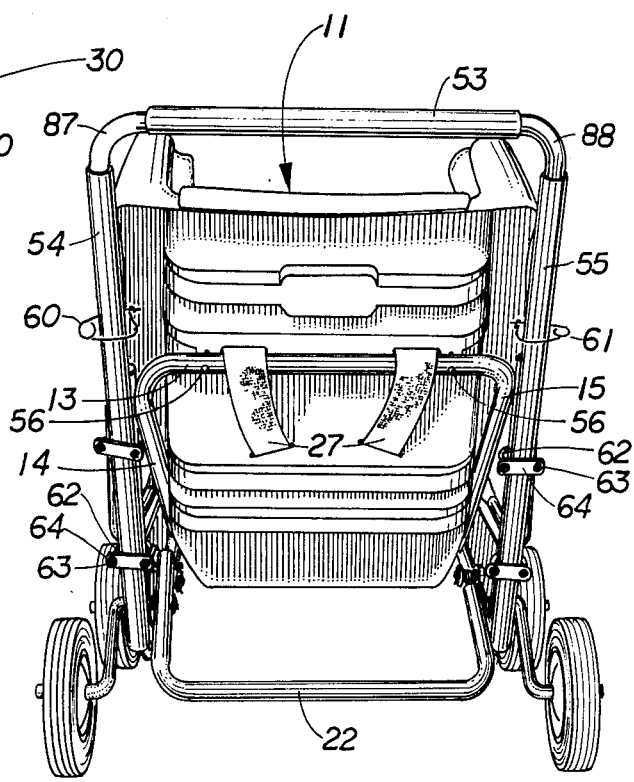
FIG. 2 is a rear perspective view of the combination of FIG. 1.

Car seat portion 11 is secured to framework 12 by rivets 56 (FIGS. 2 and 4). A plurality of straps 27 for the purpose of a safety harness for the seat occupant (FIGS. 2 to 4) are secured at one end to framework 12 by buckles 28 (FIG. 4) or the like. Of course, any releasable securing means may be used, such as mating Velcro fasteners. Also, as seen in FIG. 4, car seat portion 11 may have one or more slots 29 therein through which straps 27 extend.

Figure 5:
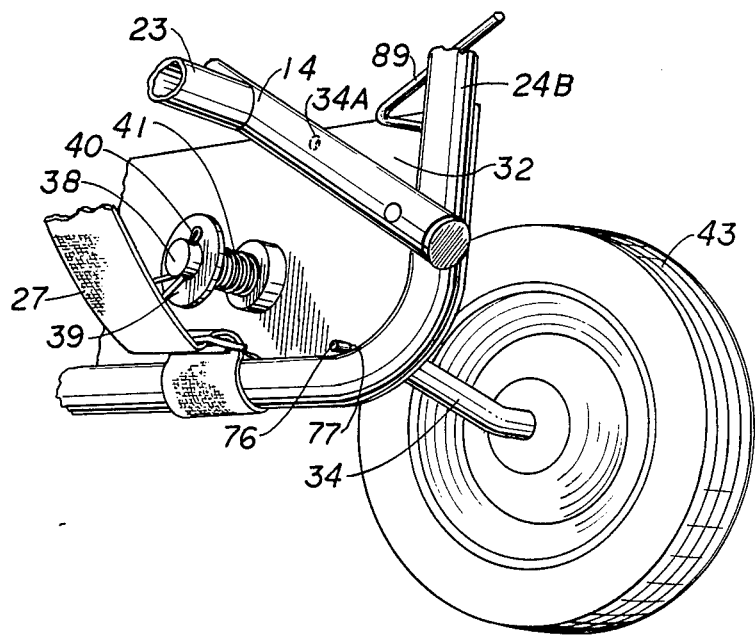
FIG. 5 is a detailed view of a portion of the wheel mechanism of the combination of FIGS. 1 through 4.

A wheeled understructure 30 is provided for converting the car seat assembly of 11 and 12 to a wheeled stroller. Such understructure 30 includes a pair of flat side plates 31, 32 (FIGS. 1 and 3) secured via screws 33 or the like to structure 12. Four wheel shafts 34 to 37 (FIGS. 1 and 3) are provided having a first curved or angled end 38 extending through plates 31, 32 (FIG. 5) each has a washer 39 mounted thereon with a cotter pin 40 extending through a hole in the terminal end of end 38 thus securing washer 39 to end 38 preventing withdrawal thereof out of each plate 31, 32. A coiled spring 41 surrounds each end 38 between washer 39 and the inner wall of each plate 31, 32 thus resiliently biasing each end 38 into the position shown in FIG. 5.

Wheels such as front wheels 42, 43 (FIG. 4) and rear wheels 44, 45 are journaled on offset portions 46 to 49, respectively, on the free ends of each shaft 34 to 37. As seen in FIG. 1, each offset portion 46 to 49 extends through the hub of each wheel 42 to 45 and receives thereabout a washer 50 with a cotter pin 51 extending through a hole in each portion 46 to 49. Thus, the wheels 42 to 45 are held fast to shafts 34 to 37 but freely rotate thereon.

Figure 6:
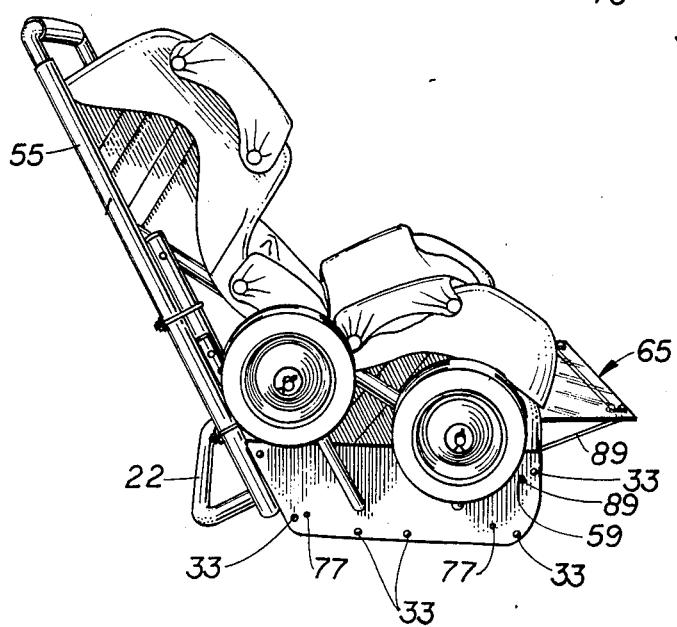
FIG. 6 is a view similar to FIG. 3 showing the wheels in stored position.
Figure 8:
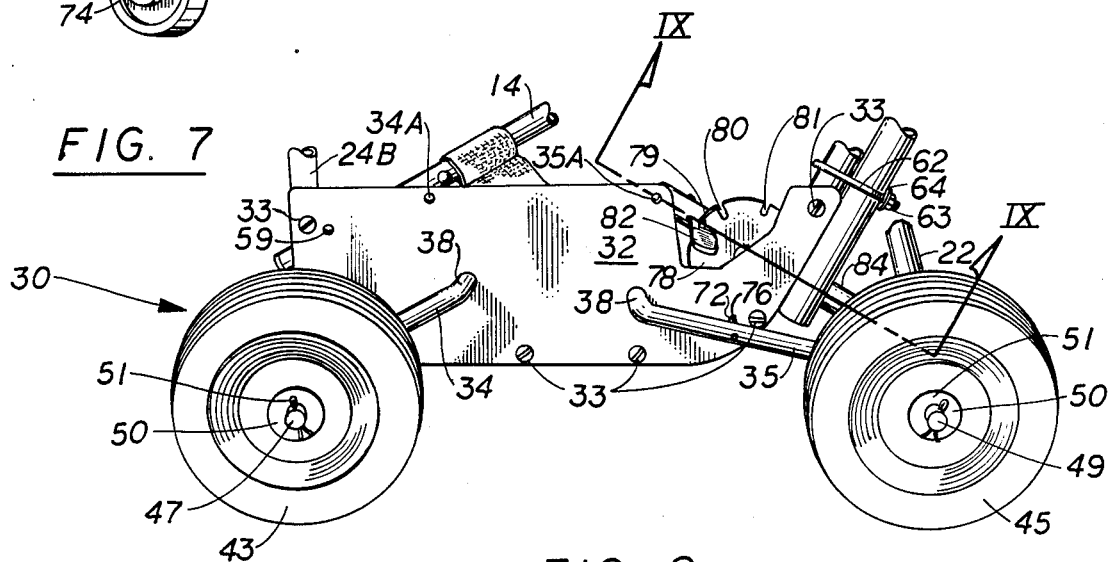
FIG. 8 is a detailed view of a portion of the wheel assembly of FIGS. 1 through 6.

As can be seen in FIG. 6, each wheel 42 to 45 and shafts 34 to 37 can be rotated up to a stored position on side plates 31 & 32. That is, each shaft 34 to 37 can be pulled out of the operative position holes 34B, 35B, 36B, 37B against the bias of springs 41 by grasping the respective wheel and rotating each shaft or tube 34 to 37 to the four holes 34A, 35A, 36A 37A which are stored positions shown in FIG. 6. Thus, the wheels 42 to 45 are spring loaded and easily and quickly movable between a stored (FIG. 6) and an operative position (FIG. 1). When in the operative position, as seen in FIG. 8, a pin 76 may be provided on each shaft 34 to 37 extending outwardly therefrom receivable in a hole 77 in plates 31 & 32 to hold the same in operative position. Pulling outwardly on each shaft 34 to 37 against the bias of spring 41 releases the pins 76 on shafts 34 to 37 from locking engagement with holes 77 and allows the shafts 34 to 37 to be rotated to the stored position with pins 77 in holes 34A to 37B as shown in FIG. 6. Pin 76 may be secured by one of several conventional means to its shaft to prevent loss.

The wheels 42 to 45 are out of the way when apparatus 10 is used as a car seat. When it is desired to use apparatus 10 as a stroller, the wheels 42 to 45 are quickly and easily moved to the operative FIG. 1 position.

A kickplate 65 (FIG. 4) may be provided having a clear plastic generally rectangular panel portion 66 secured at its uppermost edge to a straight shaft member 67 snap fitting into holes 68, 69 in front braces 24B, 25B and attached to panel 66 by a plurality of U-shaped fasteners 70 which encircle shaft 67 and extend through aligned apertures in rectangular portion 66 with nuts 71 (FIG. 3) or the like threaded thereto.

Figure 9:
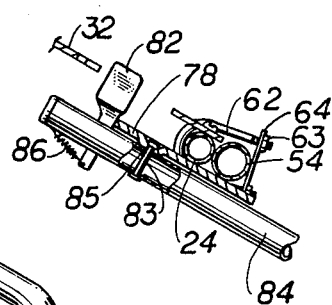
FIG. 9 is a view taken along line IX—IX of FIG. 8.

As seen in FIGS. 8 and 9, plate 32 has a cut-out section 57 at the free lower end of panel 66 is mounted a generally U-shaped bail 89 with outwardly bent extensions at the upper legs of the U. It too is secured to 66 by means of U-shaped fasteners 70 and nuts 71. The outward extensions fit into two holes 85, 59 in plates 31 & 32 respectively when the apparatus 10 is to be used as a stroller providing access to a radiused and latching plate 78 radially extending slots at the top and forward edge thereof. A locking lever 82 is shown disposed in one of the slots. As seen in FIG. 9, latching plate 78 is welded or otherwise secured to tubing 24. The rear U-shaped tubing 22 has a shaft 83 fixed to one point on latching plate 78 the other end of shaft 83 being rotatable in a hole 85 in the hub of latching plate 78. The other end of tubing 22 is connected to an L-shaped plate fastened to the inside of tubing 25. Lever 82 is connected to the upper end of leg 84 in any suitable manner and may be spring loaded as by a spring 86 extending between lever 82 and leg 84 and normally biasing lever 82 into the engaged slot of latching plate 78.

It can be appreciated that movement of lever 82 from one slot (slots 79 to 81) to the other also selectively raises and lowers tubing 22. For example, FIG. 8 shows the bottommost position of tubing 22. FIG. 3 shows an upper position of tubing 22. Tubing 22 can thus be used as a support in the rear of apparatus 10 when the same is used as a car seat. Thus, the back support for the car seat portion is adjustable. Latching plates similar to 78 are often found in conventional car seats.

Figure 7:
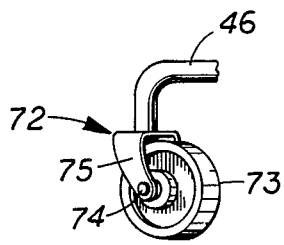
FIG. 7 is a side view of a portion of a modified wheel assembly.

Although conventional front and rear wheels have been disclosed, as seen in FIG. 7, front wheels 42, 43 may be replaced by conventional casters 72 (FIG. 9) coupled to offset portions 46, 47 with small caster wheels 73 journaled for rotation on axle 74 passing through the yoke portion 75 of each caster 72 and wheel 73.

Figure 10:
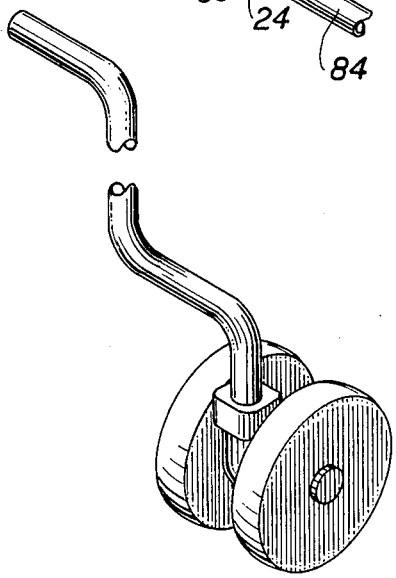
FIG. 10 is a perspective view of an element utilizable herein.

Dual wheeled caster assemblies, such as those found in lightweight fabric fold up strollers may also be employed herein for the front wheels. See FIG. 10.

It can be seen that I have disclosed apparatus which can be quickly and easily converted from a wheeled stroller to a car seat. The wheels of the apparatus, when it is used as a car seat, are in a stored position that does not interfere with the comfort of the child in the seat. Any suitable framing may be used as may be any suitable car seat portion.

Thus, the safety of a child's car seat is combined herein with the mobility of a stroller in a convenient and economical manner. When it is desired to use the device as a regular car seat, the handle can be removed, if desired, and the wheels, casters or rollers retracted. When it is desired to use the device as a stroller, the child may be left in the car seat (if desired), the handle adjusted and the wheels, rollers or casters returned to the operative position. The size of the various wheels, rollers and casters may be varied.

Any number of quick release members may be used, such as the type of quick release members used on bicycles to remove wheels therefrom.

There is thus disclosed unique and novel apparatus for quickly and easily converting a conventional car seat to a stroller, then back to a car seat when desired.

Since certain changes may be made in the above apparatus without departing from the scope of the invention herein, it is intended that all matter contained in the above description and shown in the accompanying drawings shall be interpreted as illustration and not in a limiting sense and the scope of the invention determined only by the appended claims.

I claim:

1. A combination car seat and stroller comprising:
a car seat portion having a back and a seat and framework connected to said car seat portion for supporting the same;
a wheeled understructure removably connected to said framework, said understructure having front and rear wheel assemblies; and
means associated with both said front and rear wheeled assemblies for selectively moving the same between (A) a first operative position where said wheels extend downwardly and are adapted to engage a supporting surface so that said combination can be used as a stroller; and
(B) a second inoperative position where said wheels are disposed in a stored position upwardly with respect to the lowermost portion of said combination so that said combination can be used as a car seat, said car seat portion being connected to said superstructure, in both the first and second positions;

wherein said understructure includes a pair of plates on each side of said framework extending along the bottom thereof from front to rear, each of said plates having one front wheel assembly and one rear wheel assembly mounted thereon, each of said wheel assemblies including a wheel journaled on a resiliently mounted shaft, each of said shafts extending through an opening in said plate; and locking means on each of said shafts cooperating with means on said plates for locking said shaft so that said wheel assemblies are in said first operative position.

2. In the combination of claim 1 wherein said wheels, when in said second position, are stored on opposite sides of said car seat portion.

3. In the combination of claim 1 including a kickplate disposed along the lower front of said combination.

4. In the combination of claim 1 wherein said framework includes a rear handle, said handle being comprised of telescoping sections.

5. In the combination of claim 4 wherein said handle includes an elongated horizontal cross-piece having downwardly extending portions at each end thereof telescopingly and removably received in a pair of elongate side members on each side of said car seat portion rearwardly thereof.

6. In the combination of claim 1 wherein each of said shafts includes a first offset portion having said wheel rotatably mounted thereon, an elongated portion integral with said offset portion extending in a plane parallel to the plane of its respective plate, and a second offset portion extending through a hole in its respective plate.

7. In the combination of claim 6 wherein said offset portions extend in a direction generally normal to the longitudinal axis of said elongated portion.

8. In the combination of claim 6 wherein each of said shafts is resiliently biased in a direction toward its respective plate.

9. In the combination of claim 8 wherein each of said second offset portions terminate in a stop member, said resilient bias being provided by a spring between said stop member and the inner wall of said plate.

10. In the combination of claim 9 wherein said locking means includes an elongated pin extending outwardly from each plate adjacent each of said elongated shaft portions, and a hole in each of said elongated shaft portions, said pin being receivable in said shaft portion hole when said shaft is pulled outwardly away from said plate against its spring bias when in said second inoperative stored position and rotated to its first position whereby said pin enters said hole.

11. In the combination of claim 1 wherein said locking means includes an elongated pin extending outwardly from each plate adjacent each of said shafts and a hole in each of said shafts said pin being receivable in said hole when said shaft is rotated from its second stored position to its first position whereby said pin enters said hole.

12. In the combination of claim 1 wherein said front wheels are casters.

13. In the combination of claim 1 including back support means for bracing the back of said car seat portion against a rear support surface when said wheel assemblies are in said second inoperative position.

14. In the combination of claim 13 wherein said back support means includes an adjustable U-shaped tubing having side legs connected to each side of said framework at the lower rear thereof.

15. In the combination of claim 14 including adjusting means engaging said U-shaped tubing accessible through an opening in one of said plates for selectively adjusting the position of said U-shaped tubing.

16. In the combination of claim 12 wherein dual wheel casters are employed as the casters.

17. A combination car seat and stroller comprising:
a car seat portion having a back and a seat, and framework connected to said car seat portion for supporting the same;
a wheeled understructure connected to said framework, said understructure having front and rear wheel assemblies; and
means associated with both said front and rear wheel assemblies for selectively moving the same between (A) a first operative position where said wheels extend downwardly and are adapted to engage a supporting surface so that said combination can be used as a stroller and (B) a second inoperative position where said wheels are disposed in a stored position upwardly with respect to the lowermost portion of said combination so that said combination can be used as a car seat, wherein said understructure includes a pair of plates on each side of said framework extending along the bottom thereof from front to rear, each of said plates having one front wheel assembly and one rear wheel assembly mounted thereon, each of said wheel assemblies including a wheel journaled on a resiliently mounted shaft, each of said shafts extending through an opening in said plate, and locking means, part of which is on each of said shafts and on each of said plates for locking each said shaft so that said wheel assemblies are in said first operative position, and further wherein each of said shafts includes a first offset portion having said wheel rotatably mounted thereon, an elongated portion integral with said offset portion extending in a plane parallel to the plane of its respective plate, and a second offset portion extending through a hole in its respective plate.

* * * * *